United States Patent
Villarreal et al.

(10) Patent No.: US 10,067,854 B2
(45) Date of Patent: Sep. 4, 2018

(54) SYSTEM AND METHOD FOR DEBUGGING SOFTWARE EXECUTED AS A HARDWARE SIMULATION

(71) Applicant: Xilinx, Inc., San Jose, CA (US)

(72) Inventors: Jason Villarreal, Los Gatos, CA (US); Kumar Deepak, San Jose, CA (US)

(73) Assignee: XILINX, INC., San Jose, CA (US)

( * ) Notice: Subject to any disclaimer, the term of this patent is extended or adjusted under 35 U.S.C. 154(b) by 30 days.

(21) Appl. No.: 15/334,182

(22) Filed: Oct. 25, 2016

(65) Prior Publication Data

US 2018/0113787 A1    Apr. 26, 2018

(51) Int. Cl.
G06F 9/44      (2018.01)
G06F 11/36     (2006.01)

(52) U.S. Cl.
CPC ...... *G06F 11/3636* (2013.01); *G06F 11/3632* (2013.01); *G06F 11/3648* (2013.01)

(58) Field of Classification Search
CPC ..................................... G06F 11/362–11/3696
USPC ................................................. 717/129–135
See application file for complete search history.

(56) References Cited

U.S. PATENT DOCUMENTS

| | | | |
|---|---|---|---|
| 5,920,711 A * | 7/1999 | Seawright | G06F 17/5045 703/15 |
| 5,995,744 A | 11/1999 | Guccione | |
| 6,182,268 B1 * | 1/2001 | McElvain | G06F 17/5045 716/104 |
| 6,188,975 B1 | 2/2001 | Gay | |
| 6,212,650 B1 | 4/2001 | Guccione | |
| 6,584,601 B1 * | 6/2003 | Kodosky | G06F 17/5054 715/771 |
| 6,594,802 B1 * | 7/2003 | Ricchetti | G01R 31/31705 714/727 |
| 6,701,491 B1 * | 3/2004 | Yang | G01R 31/31715 716/106 |
| 6,868,376 B2 * | 3/2005 | Swoboda | G06F 11/3656 331/18 |

(Continued)

OTHER PUBLICATIONS

High-Level Synthesis for FPGAs: From Prototyping to Deployment—Jason Cong, Fellow, IEEE, Bin Liu, Stephen Neuendorffer, Member, IEEE, Juanjo Noguera,Kees Vissers, Member, IEEE, and Zhiru Zhang, Member, IEEE-IEEE Transactions on Computer-Aided Design of Integrated Circuits and Systems, vol. 30, No. 4, Apr. 2011.*

(Continued)

*Primary Examiner* — Francisco Aponte
(74) *Attorney, Agent, or Firm* — LeRoy D. Maunu

(57) ABSTRACT

Approaches for debugging include receiving by a hardware debug server, a high-level language (HLL) debugging command for setting a breakpoint in an HLL software specification. The hardware debug server translates the HLL debugging command into a hardware debugging command that specifies a condition of a hardware finite state machine that is representation of the software specification. The hardware debugging command is input to a simulator. The simulator adds a conditional breakpoint on the finite state machine in response to the hardware debugging command and executes a simulation of the finite state machine representation. Execution of the simulation is suspended in response to the detecting the condition in the finite state machine.

18 Claims, 5 Drawing Sheets

(56) References Cited

U.S. PATENT DOCUMENTS

| | | | |
|---|---|---|---|
| 6,931,572 B1* | 8/2005 | Schubert | G01R 31/31704 714/30 |
| 6,985,980 B1 | 1/2006 | Allegrucci | |
| 7,069,526 B2* | 6/2006 | Schubert | G01B 31/318357 716/102 |
| 7,072,818 B1* | 7/2006 | Beardslee | G01R 31/31705 703/14 |
| 7,165,231 B2* | 1/2007 | Buckley, Jr. | G06F 17/5022 703/16 |
| 7,240,303 B1* | 7/2007 | Schubert | G01R 31/31705 703/13 |
| 7,308,564 B1 | 12/2007 | Jenkins, IV | |
| 7,506,286 B2* | 3/2009 | Beardslee | G01R 31/31705 703/14 |
| 7,523,030 B2* | 4/2009 | Harada | G06F 17/5022 703/14 |
| 7,805,593 B1 | 9/2010 | Donlin | |
| 7,823,117 B1* | 10/2010 | Bennett | G06F 17/5054 703/13 |
| 7,827,510 B1* | 11/2010 | Schubert | G06F 17/5027 716/111 |
| 7,836,416 B2* | 11/2010 | Schubert | G06F 17/504 703/13 |
| 8,079,013 B1* | 12/2011 | Ma | G06F 17/5045 703/13 |
| 8,099,271 B2* | 1/2012 | Schubert | G01R 31/31704 703/16 |
| 8,214,701 B1* | 7/2012 | Malhotra | G06F 11/3656 714/725 |
| 8,244,512 B1* | 8/2012 | Tseng | G06F 17/5022 703/13 |
| 8,327,200 B1 | 12/2012 | Mohan | |
| 8,458,667 B2* | 6/2013 | Hartadinata | G06F 11/3656 717/124 |
| 8,595,555 B1 | 11/2013 | Taylor | |
| 8,595,561 B1 | 11/2013 | Lu et al. | |
| 8,701,060 B2* | 4/2014 | Brinkmann | G06F 17/504 716/106 |
| 8,739,129 B1* | 5/2014 | Mosterman | G06F 11/3664 717/125 |
| 8,775,986 B1* | 7/2014 | Mohan | G06F 17/5054 716/104 |
| 9,032,345 B2* | 5/2015 | Brinkmann | G06F 17/5045 716/102 |
| 9,171,115 B2* | 10/2015 | Alfieri | G06F 17/505 |
| 9,195,784 B2* | 11/2015 | Tseng | G06F 17/5022 |
| 9,262,305 B1 | 2/2016 | Wilmot et al. | |
| 9,378,071 B2* | 6/2016 | Scomparim | G06F 7/00 |
| 2003/0106004 A1* | 6/2003 | Ricchetti | G01R 31/318544 714/733 |
| 2004/0025122 A1* | 2/2004 | Schubert | G06F 17/5022 716/106 |
| 2004/0181385 A1* | 9/2004 | Milne | G06F 17/5022 703/14 |
| 2004/0250244 A1 | 12/2004 | Albrecht | |
| 2005/0273660 A1* | 12/2005 | Colle | G06F 11/3624 714/27 |
| 2011/0307847 A1* | 12/2011 | Liao | G06F 17/5027 716/103 |
| 2013/0125097 A1* | 5/2013 | Ebcioglu | G06F 17/5045 717/136 |
| 2015/0046753 A1* | 2/2015 | Cecka | G06F 11/3656 714/38.1 |
| 2017/0269157 A1* | 9/2017 | Mao | G01R 31/31701 |
| 2018/0039566 A1* | 2/2018 | Luenstroth | G06F 8/41 |

OTHER PUBLICATIONS

Effective FPGA Debug for High-Level Synthesis Generated Circuits—Jeffrey Goeders and Steven J.E. Wilton, Department of Electrical and Computer Engineering University of British Columbia Vancouver, Canada; Field Programmable Logic and Applications (FPL), 2014 24th International Conference in Germany.*

High-Level Synthesis Techniques for In-Circuit Assertion-Based Verification—John Curreri, Greg Stitt, Alan D. George NSF Center for High-Performance Reconfigurable Computing (CHREC) ECE Department, University of Florida—Parallel & Distributed Processing, Workshops and Phd Forum (IPDPSW), 2010 IEEE International Symposium in Atlanta, GA.*

Techniques for Enabling In-System Observation-based Debug of High-Level Synthesis Circuits on FPGAs by Jeffrey Goeders-BASc Computer Engineering, University Toronto, 2010; MASc Computer Engineering, The University of British Columbia, 2012—The University of British Columbia (Vancouver) Sep. 2016.*

* cited by examiner

┌─ 202 ─────────────────────────────────┐  ┌─ 204 ──────────────────────────────────────────────┐

```
1: void vadd(const int* input, int* output)
2: {
3:   int counter ;
4:   unsigned int i ;
5:
6:   counter = 1 ;
7:   for (i = 0 ; i < 25 ; ++i)
8:   {
9:     output[i] = input[i] + counter ;
10:    counter += 1 ;
11:  }
12: }
```

```
// The RTL signals that correspond to
//   the high level language variable "counter"
reg  [4:0] vadd_counter_reg_95;
reg  [4:0] ap_pipeline_reg_iter1_vadd_counter_reg_95;
reg  [4:0] ap_pipeline_reg_iter2_vadd_counter_reg_95;
reg  [4:0] ap_pipeline_reg_iter3_vadd_counter_reg_95;
reg  [4:0] ap_pipeline_reg_iter4_vadd_counter_reg_95;
reg  [4:0] ap_pipeline_reg_iter5_vadd_counter_reg_95;
reg  [4:0] ap_pipeline_reg_iter6_vadd_counter_reg_95;
reg  [4:0] ap_pipeline_reg_iter7_vadd_counter_reg_95;
reg  [4:0] ap_pipeline_reg_iter8_vadd_counter_reg_95;

// Additional HLS generated code...

// The RTL statement that executes the lines:
//   "counter += 1" and "counter = 1"
always @ (posedge ap_clk) begin
  if (((1'b1 == ap_CS_fsm_pp0_stage0)   &
       (1'b1 == ap_enable_reg_pp0_iter0) &
       (1'b0 == exitcond_fu_146_p2)))
  begin
    vadd_counter_reg_95 <= p_reg2mem_0_i_i_fu_152;
  end
  else if (((ap_CS_fsm_state1 == 1'b1) &
            ~(1'b0 == ap_start)))
  begin
    vadd_counter_reg_95 <= ap_const_lv5_0;
  end
end
```

FIG. 2

SYSTEM AND METHOD FOR DEBUGGING SOFTWARE EXECUTED AS A HARDWARE SIMULATION

TECHNICAL FIELD

The disclosure generally relates to debugging software that has been transformed into a hardware description using a software debugger.

BACKGROUND

One technique for improving performance of a software system is to implement selected sections as hardware accelerators. Those sections of the system that exhibit high computational complexity and consume large portions of total runtime may be suitable candidates for implementing as hardware accelerators. The hardware accelerators could be application specific integrated circuits (ASICs), graphics processing units (GPUs), or circuitry running on field programmable gate arrays (FPGAs), for example. A common approach employed by software designers in creating a hardware accelerator is to use a high-level synthesis (HLS) tool to convert the original high-level language (HLL) specification of the identified section into an equivalent register transfer level (RTL) or other hardware description language (HDL) specification of the circuit.

Although the generated RTL specification may be functionally identical to the HLL specification, the software designer may need to debug the RTL specification in the course of system development. Issues involving timing, concurrency and race conditions may have been masked when developing the HLL specification and can surface during hardware simulation. Also, differences in software and hardware library implementations, incorrect translation, or differences in memory access can create implementation problems.

Debugging of RTL implementations can be facilitated through simulators such as the VIVADO® simulator from XILINX, Inc., or the QUEST® simulator from Mentor Graphics Corporation. In testing the RTL implementation, the software designer traces low-level signals and registers and interpret waveforms.

SUMMARY

A disclosed method of debugging includes receiving by a hardware debug server that is executing on a computer system, a high-level language (HLL) debugging command for setting a breakpoint in an HLL software specification. The hardware debug server translates the HLL debugging command into a hardware debugging command that specifies a condition of a hardware finite state machine that is representation of the software specification. The hardware debugging command is input to a simulator, and in response to the hardware debugging command the simulator adds a conditional breakpoint on the finite state machine. The simulator executes a simulation of the finite state machine representation and suspends execution of the simulation in response to the detecting the condition in the finite state machine.

A disclosed debugging system includes a processor and a memory arrangement coupled to the processor. The memory arrangement is configured with instructions that when executed by the processor cause the processor to perform operations including receiving by a hardware debug server, a high-level language (HLL) debugging command for setting a breakpoint in an HLL software specification. The hardware debug server translates the HLL debugging command into a hardware debugging command that specifies a condition of a hardware finite state machine that is representation of the software specification. The hardware debugging command is input to a simulator, and in response to the hardware debugging command the simulator adds a conditional breakpoint on the finite state machine. The simulator executes a simulation of the finite state machine representation and suspends execution of the simulation in response to the detecting the condition in the finite state machine.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings in which:

FIG. 2 shows an example of HLL source code and the equivalent sections of the HLS-generated RTL code;

DETAILED DESCRIPTION

Figure 1:
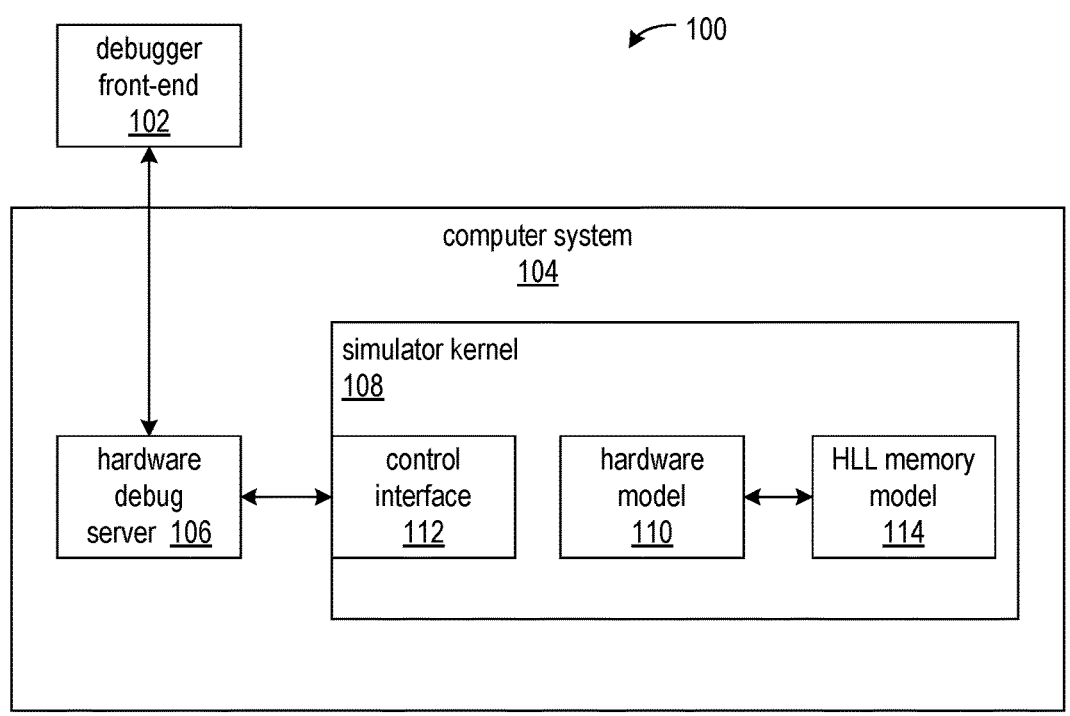
FIG. 1 shows an implementation of a system that supports debugging a hardware accelerator using software debugging techniques and approaches.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The debugging environment with which a software designer may be familiar differs substantially from the debugging environment provided by RTL simulators. Software debuggers provide capabilities such as setting breakpoints at specific instructions or lines of sequentially executing program code and inspecting and editing variables, the values of which may be stored in registers or memory during program execution. The software debugger presents debug information at the source code level, which allows the software designer to easily correlate desired actions of the software debugger and state of the executing program with HLL program names and statements.

The debugging environment of an RTL simulator operates at the signal level. The RTL simulator provides the ability to set breakpoints based on signal states, trace signal states, view waveforms, and inspect registers. However, the software designer may be unfamiliar with the RTL structure and unfamiliar with the association between elements of the HLL program and the signal names and particular registers in the RTL structure. Thus, a software designer can be hindered from timely debugging a hardware accelerator.

The disclosed methods and systems bridge the gap between the software debugging environment with which software designers are familiar and the RTL debugging environment available to hardware designers. The methods and systems support debugging features that are found in software debuggers, such as setting breakpoints at particular lines of HLL program code, inspecting the values of variables by HLL names of the variables and inspecting the contents of memory. The system handles the mapping between HLL constructs and RTL constructs, which allows the software designer to debug the hardware accelerator as if operating in the software debugger environment.

In the disclosed implementations, a hardware debug server executing on a computer system receives a debugging command from a software debugger front-end for setting a breakpoint in an HLL software specification. The hardware debug server translates the debugging command into a hardware debugging command that specifies a condition of a hardware finite state machine that is representation of the software specification, and inputs the hardware debugging command to a simulator. The simulator adds a conditional breakpoint on the hardware finite state machine and executes a simulation of the finite state machine representation. The simulator suspends execution of the simulation in response to the detecting the condition in the hardware finite state machine.

FIG. 1 shows an implementation of a system 100 that supports debugging a hardware accelerator using software debugging techniques and approaches. The system supports interaction between software debuggers, such as GDB, and simulation of the hardware accelerator generated from the HLL source code. The view of the simulated hardware accelerator provided by the system is provided by a software debugger in debugging the HLL source code. The system includes a debugger front-end 102, a hardware debug server 106, and a simulator kernel 108. The simulator kernel includes a control interface 112 and simulates the hardware model 110 of the hardware accelerator. The hardware model can be a hardware finite state machine as specified in a register transfer level (RTL) language, for example. The HLL model with memory 114 simulates a memory component of the HLL design that is accessible by the hardware model 110. The hardware debug server and simulator kernel execute on the computer system 104. In one implementation, the debugger front-end can also execute on computer system 104. Alternatively, the debugger front-end can execute on another computer system (not shown) that is coupled to computer system 104 via a network interface to a network, such as a LAN or the Internet. The debugger front-end 102 and hardware debug server 106 can be communicatively coupled using a protocol such as TCP/IP.

Some prior software debuggers, which support debugging software but not hardware accelerators, include a software debug server, which allows a debugger front-end executing on one computer system to control debugging of software executing on another computer system. In one implementation, the debugger front-end 102 can be a part of a generally available software debugger such as the GNU debugger, GDB. The debugger front-end uses debugging information in a standard format, for example DWARF information, in presenting the executing program state in terms of the original HLL source code. Variable names in the HLL source code are displayed with corresponding values read from hardware registers. In an example implementation, the debugger front-end 102 communicates with the hardware debug server 106 using the same protocol as is used for communication with a software debug server. In an implementation involving a debugger front-end from GDB, the debugger front-end communicates with the hardware debug server using the Remote Serial Protocol (RSP), which is the same protocol the debugger front-end from GDB uses for communication with a software debug server.

The hardware debug server 106 translates commands and data between the debugger front-end 102 and the simulator kernel 108. The hardware debug server connects to the simulator kernel via control interface 112 using TCP/IP, for example. The control interface 112 handles communication with the hardware debug server on behalf of the simulator kernel by processing commands and returning values of the simulated hardware model 110. The hardware debug server allows the debugger front-end to execute in the same manner in debugging the hardware model 110 as the debugger front-end would in debugging software. The hardware debug server abstracts the hardware simulation semantics and details and presents a software-oriented view to the user. The simulator kernel 108 can be part of a known circuit design simulator having the adaptations described herein.

In a debugging scenario, the hardware debug server 106 receives from the debugger front-end, a high-level language (HLL) debugging command for setting a breakpoint in an HLL software specification. The person debugging the hardware accelerator interacts with the debugger front-end to select a particular instruction or line number in the HLL software specification from which the hardware model 110 was generated. Those skilled in the art will recognize that known HLS tools can be used to generate a circuit design description and a corresponding hardware model suitable for simulation from HLL source code.

In response to receiving the HLL debugging command, the hardware debug server translates the HLL debugging command into a hardware debugging command that specifies a condition of a hardware finite state machine, which was generated by the HLS tool from the software specification. The hardware debug server then communicates the hardware debugging command to the control interface 112 for input to the simulator 108. The simulator, in response to the hardware debugging command, adds a conditional breakpoint on the hardware finite state machine. In executing a simulation of the hardware finite state machine, the simulator suspends execution of the simulation in response to the detecting the condition in the finite state machine.

Once execution of the simulation is suspended upon detecting the condition in the hardware finite state machine, the simulator communicates the suspension to the hardware debug server, and the hardware debug server determines the line number, instruction or statement of the HLL software specification that corresponds to the condition in the RTL finite state machine. The hardware debug server then outputs the HLL line number, instruction or statement of the HLL software specification and an indication of the breakpoint to the debugger front-end.

In some instances the simulated hardware accelerator can be part of a system design in which a global memory is accessed by the hardware accelerator and by other hardware and/or software components of the system. Large memories are often simulated by using HLL code (HLL memory model 114) that is accessed by HLS-generated components (including the hardware accelerator) via a direct programming interface (DPI). A person operating the debugger front-end 102 may want to inspect the values of HLL variables stored in the HLL memory model. However, the simulator kernel 108 would not have direct access to the HLL memory model even though the HLS-generated components can access the HLL memory while the simulation is executing. In order to provide direct access to the HLL memory model 114 by the simulator kernel 108, the simulator kernel is adapted to register callback functions for accessing (i.e., reading or writing) the memory. When the hardware debug server receives an HLL debugging command that requests a value of a variable of the HLL software specification and that variable is stored in the HLL memory model, the simulator executes the callback function to read the value of the signal by the simulator from the memory. The hardware debug server outputs the value of the variable and the HLL variable name to the debugger front-end.

FIG. 2 shows an example of HLL source code 202 and the equivalent sections of the HLS-generated RTL code 204 dealing with HLL program variable, "counter." The HLL source code has 12 numbered lines including a function statement, variable declarations, assignment statements, a control statement, scope delimiters, and a blank line.

The HLL variable "counter" maps to the 5-bit registers in RTL, each of which is active during different stages of the generated FSM machine. The registers include:
 reg [4:0] vadd_counter_reg_95;
 reg [4:0] ap_pipeline_reg_iter1_vadd_counter_reg_95;
 reg [4:0] ap_pipeline_reg_iter2_vadd_counter_reg_95;
 reg [4:0] ap_pipeline_reg_iter3_vadd_counter_reg_95;
 reg [4:0] ap_pipeline_reg_iter4_vadd_counter_reg_95;
 reg [4:0] ap_pipeline_reg_iter5_vadd_counter_reg_95;
 reg [4:0] ap_pipeline_reg_iter6_vadd_counter_reg_95;
 reg [4:0] ap_pipeline_reg_iter7_vadd_counter_reg_95;
 reg [4:0] ap_pipeline_reg_iter8_vadd_counter_reg_95;

The HLL statement, counter+=1; maps to the "if" portion of the always block and the RTL statement,
 vadd_counter_reg_95<=p_reg2mem_0_i_i_fu_152;
is executed in the simulation when the condition (ap_CS_fsm_pp0_stage0==1'b1) & (ap_enable_reg_pp0_iter0==1'b1) & (exitcond_fu_146_p2==1'b0) is true on a positive edge of the main clock.

The HLL statement, counter=1; maps to the "else if" portion of the always block, and the RTL statement,
 vadd_counter_reg_95<=ap_const_lv5_0;
is executed in the simulation when the condition, (ap_CS_fsm_state1==1'b1) & ~(ap_start==1'b0) is true on a positive edge of the main clock.

In response to receiving from the debugger front-end 102 breakpoint commands specifying the HLL lines 6 and 10, the hardware debug server translates the HLL breakpoint commands into the corresponding RTL simulator breakpoint commands that specify the RTL conditions and submits the commands to the control interface 112. The control interface of the simulator kernel adds the breakpoints to stop the simulation before the RTL statements are executed in the simulation. In response to a command from the debugger front-end to set a breakpoint at HLL code line 6, the hardware debug server generates simulator kernel command that sets a breakpoint that causes the simulation to stop when the condition (ap_CS_fsm_state1==1'b1) & ~(ap_start==1'b0) is true on a positive edge of the main clock, which is before the RTL statement vadd_counter_reg_95<=ap_const_lv5_0; is executed in the simulation. In response to a command from the debugger front-end to set a breakpoint at HLL code line 10, the hardware debug server generates simulator kernel command that sets a breakpoint that causes the simulation to stop when the condition (ap_CS_fsm_pp0_stage0==1'b1) & (ap_enable_reg_pp0_iter0==1'b1) & (exitcond_fu_146_p2==1'b0) is true on a positive edge of the main clock, which is before the RTL statement, vadd_counter_reg_95<=p_reg2mem_0_i_i_fu_152; is executed in the simulation.

Figure 3:
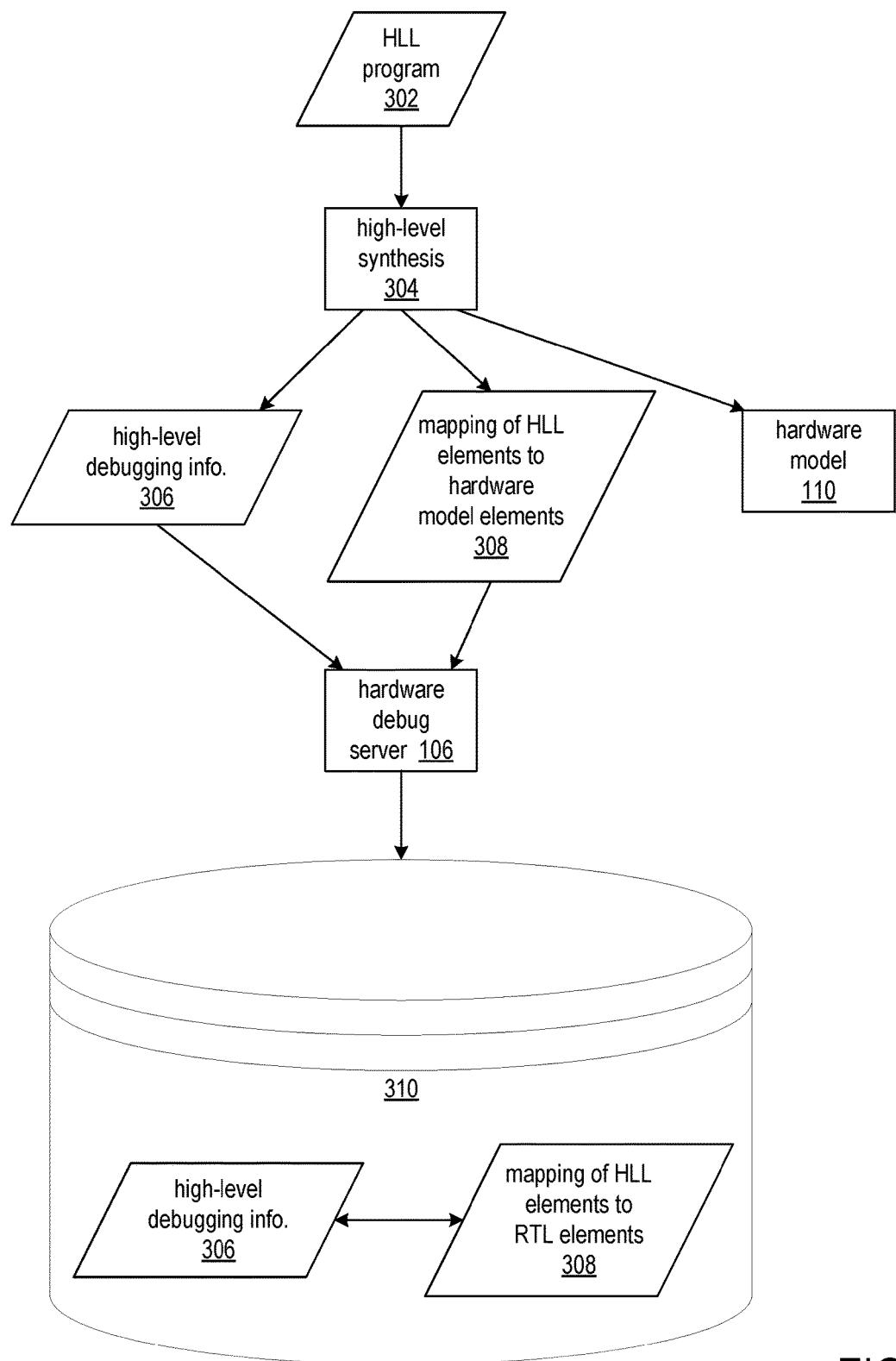
FIG. 3 is a dataflow diagram that illustrates generation of the data used by the hardware debug server in debugging a hardware accelerator using a software debugger front-end.

FIG. 3 is a dataflow diagram that illustrates generation of the data used by the hardware debug server in debugging a hardware accelerator using a software debugger front-end. The HLS tool 304 inputs the HLL program 302, which specifies the function to be implemented by a hardware accelerator. The HLS tool generates multiple versions of debugging information for use by the hardware debug server 106. At the beginning of the HLS tool flow, after front-end parsing but before optimization, the HLS intermediate representation is processed to generate an executable program (hardware model 110) that is targeted to a particular CPU. The executable has associated high-level debugging information 306 which is used to provide to the debugger front-end (FIG. 1, #102) symbols relevant to the original HLL program 302. The high-level debugging information is also used by the hardware debug server 106 in building the cross-reference database 310. In one implementation, the high-level debugging information is DWARF debugging information.

In the optimization and scheduling passes of the HLS tool 304, the HLS tool generates the mapping information 308. The mapping information 308 specifies associations between elements of HLL program 302 and elements in the hardware model 110. The hardware model specifies a finite state machine in which an active state specifies those statements of the HLL program processed concurrently during simulation. With the mapping information, breakpoints on line numbers, statements, or instructions of the HLL program can be accomplished with simulator conditions that correspond to states of the hardware state machine.

The hardware debug server 106 inputs the high-level debugging information 306 and the mapping information 308 and generates cross-reference database 310, which cross-references the high-level debugging information 306 with the mapping information 308. The database 310 is queried by the hardware debug server 106 during simulation using the hardware model to lookup elements of the hardware model that correspond to HLL program elements specified in commands from the debugger front-end (FIG. 1, #102), and to lookup HLL program elements that correspond to elements of the hardware model referenced in data returned from the simulator kernel (FIG. 1, #108).

The construction of the mapping of lines in the HLL program 302 to which breakpoint can be applied, to corresponding hardware state machine elements is dependent on the structure of the HLS-generated hardware model 110. In one implementation, the hardware model includes a finite state machine in which HLL statements correspond to conditions on RTL signals. By querying the cross-reference database 310, the hardware debug server 106 can translate breakpoint commands from the software debugger front-end into equivalent conditions on the hardware finite state machine. The conditions on the hardware finite state machine can be input to the simulator kernel to add the conditional breakpoints on the hardware model. The hardware debug server can translate commands from the software debugger front-end in which the commands request values of variables, into requests for values of hardware signals and variables from the simulator kernel by querying the cross-reference database.

Variables at the high level language level have an intricate type system built up off of concrete base types defined by the language. When high level language programs are synthesized using HLS tools, the generated hardware will typically have these types optimized and flattened into bit vectors. For example, the HLS tool might determine that a variable declared as "int" in the high level language only uses the seventeen low order bits and synthesize hardware that contains seventeen bit registers and bit-vectors as opposed to the thirty-two bit registers expected by the high level language.

The HLS tool captures the transformation of types in order to provide a complete mapping from the HLL constructs to RTL constructs. Table 1 shows a textual view of the type of mapping information used in translating types from HLL constructs into RTL constructs and vice versa. A direct mapping of each RTL type to the original type implies a conversion rule, such as sign extension or zero-extension. Additionally, the HLS tool may make the decision to create hardware where a high level language construct is stored in many different RTL registers or signals; the mapping specifies how these many RTL signals are assembled back into the original high level representation. The implementation and storage of this mapping can be done through a binary encoding.

TABLE 1

| HLL Type | RTL Type | Conversion Rule |
|---|---|---|
| int | [16:0] logic | Sign extend to 32-bits |
| float | [31:0] logic | Interpret 32-bits as floating point number |
| unsigned long long int | Two 32-bit logic vectors | Append vector 1 to vector 2 |

In the HLS-generated RTL, an HLL variable may be implemented as not just a single register, but as multiple registers and signals that are may be active at different clock cycles or may all be simultaneously active based upon pipelining decisions made by the HLS tool. The mapping information 308 specifies the set of registers and signals that make up the state register for the finite state machine and any pipeline stage activation registers. Table 2 shows and example of a mapping location of location information for the HLL variable, "counter."

TABLE 2

| Finite State Machine + Pipeline configuration | Locations |
|---|---|
| 00001a78 | vadd_counter_reg_101 |
| 00001af* | ap_pipeline_reg_pp0_iter1_vadd_counter_reg_101 |
| 00001ff* | vadd_counter_reg_101, vadd_counter_reg_99 |
| <End of list> | |

For every HLL variable, the HLS tool creates a mapping from different configurations of these state registers to a list of other RTL signals that represent the active signals where that variable is located at that clock cycle. The textual example shown in Table 2 represents the binary encoding of the meta-data output by the HLS tool and includes wildcards to represent all permutations of particular bits as being valid for a single mapping.

Each line of source code in the original HLL program starts execution in the RTL code when a certain FSM state is active. States in the FSM are active when a certain RTL condition is true, such as when the state registers are in a certain configuration and when memory fetches have completed.

As shown textually in Table 3, the cross-reference database maintains a mapping of lines in the original HLL program to conditions in the generated RTL model that correspond to configurations that represent when an FSM state starts execution, including any generated pipeline information. Note that the mapping may not be one-to-one, because the generated RTL model may start several statements simultaneously or out of order in order to best utilize the available resources and maximize throughput.

TABLE 3

| High Level Language Breakable Lines | HLS-Generated Conditions/FSM States |
|---|---|
| main.c: 5 | CS_state13 == 1 && memReady == 1 |
| main.c: 6 | CS_state13 == 1 && memReady == 1 |
| main.c: 7 | CS_state155 == 1 |
| kernel.cpp: 15 | CS_state16 == 1 && Pipeline_16 == 1 |

Figure 4:
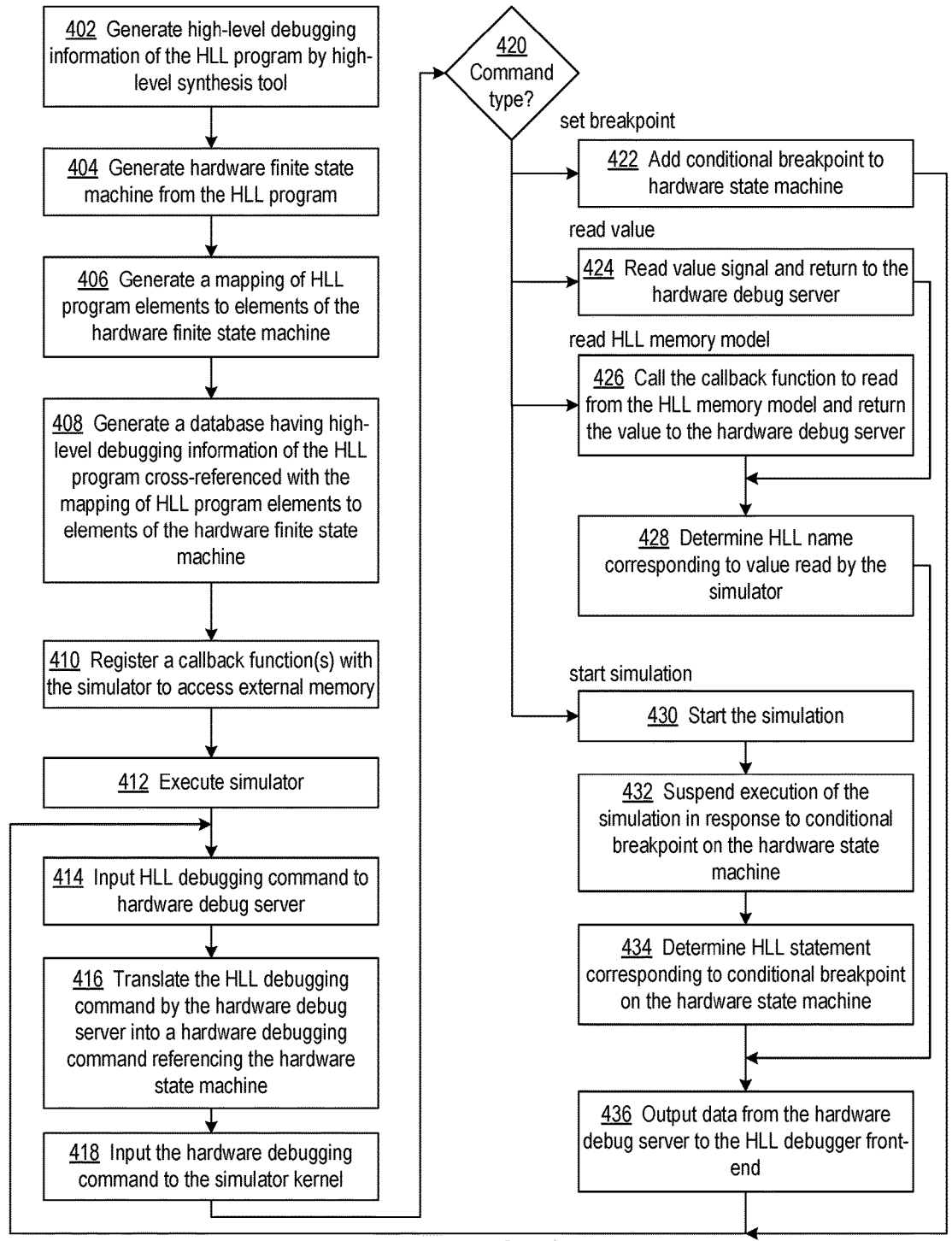
FIG. 4 is flowchart of a process of generating the data used by the hardware debug server in debugging a hardware accelerator using a software debugger front-end, and actions of the hardware debug server while debugging a hardware accelerator.

FIG. 4 is flowchart of a process of generating the data used by the hardware debug server in debugging a hardware accelerator using a software debugger front-end, and actions of the hardware debug server while debugging a hardware accelerator. At block 402, a high-level synthesis (HLS) tool generates high-level debugging information from an HLL program. The high-level debugging information can be DWARF debugging information as is known in the art. At block 404, the HLS tool generates a hardware model of the HLL program. The hardware model can be an RTL finite state machine, for example. The HLS tool generates a mapping of HLL program elements to elements of the hardware model at block 406.

At block 408, before the hardware debug server is used in simulation of a hardware model, the hardware debug server inputs the high-level debugging information of the HLL program from which the hardware model was generated and inputs the mapping of HLL program elements to elements of the hardware model. The hardware debug server generates the cross-reference database from the high-level debugging information and the mapping of HLL program elements to elements of the hardware model.

One or more callback functions are registered with the simulator kernel at block 410. The callback functions can be executed by the simulator kernel for reading from or writing to an HLL memory model (FIG. 1, #114) in response to requests from the debugger front-end made through the hardware debug server.

At block 412, the simulator commences execution with hardware debug server and simulator kernel executing on one computer system and the debugger front-end executing on the same or another computer system. The debugger front-end inputs a software debugging command from a user at block 414, and the debugger front-end transmits the command to the hardware debug server. At block 416, the hardware debug server translates the software debugging command into a hardware debugging command that is compatible with the simulator kernel. If the command from the debugger front-end references an element of the HLL program, the hardware debug server translates the reference to an element of the hardware model.

At block 418, the translated command is input to the simulator kernel. Decision block 420 switches processing according to the particular command. For a command that specifies setting a breakpoint, at block 422, the simulator kernel adds a conditional breakpoint to the hardware model. The conditional breakpoint can specify the state of a signal in the hardware model. After block 422, process returns to block 414 to process another command.

For a command that specifies reading the value of a signal or variable, at block 424, the simulator kernel reads the value of the signal or variable and returns the value to the hardware debug server.

For a command to read a value from an HLL memory model, at block 426, the simulator kernel calls the callback function to read the value. The value read from the HLL memory model is returned to the hardware debug server.

At block 428, for commands that resulted in the simulator reading the value of a signal of the hardware model or from an HLL memory model, the hardware debug server queries the cross-reference database to determine the name in the HLL program that corresponds to the name returned by the simulator kernel.

For a command to start the simulation, at block 430 the simulator kernel commences simulation of the hardware model. At block 432, in response to satisfaction of a conditional breakpoint on the hardware finite state machine, the simulator suspends the simulation and communicates the suspension and conditional breakpoint via the control interface (FIG. 1, #112) to the hardware debug server. At block 434, the hardware debug server queries the cross-reference database (FIG. 3, #310) to determine the HLL statement that corresponds to the conditional breakpoint on an element of the hardware finite state machine.

The hardware debug server at block 436 formats the data returned from the simulator kernel into the format compatible with the debugger front-end and outputs formatted data to the debugger front-end. Processing then returns to block 414 to process another command from the debugger front-end.

Figure 5:
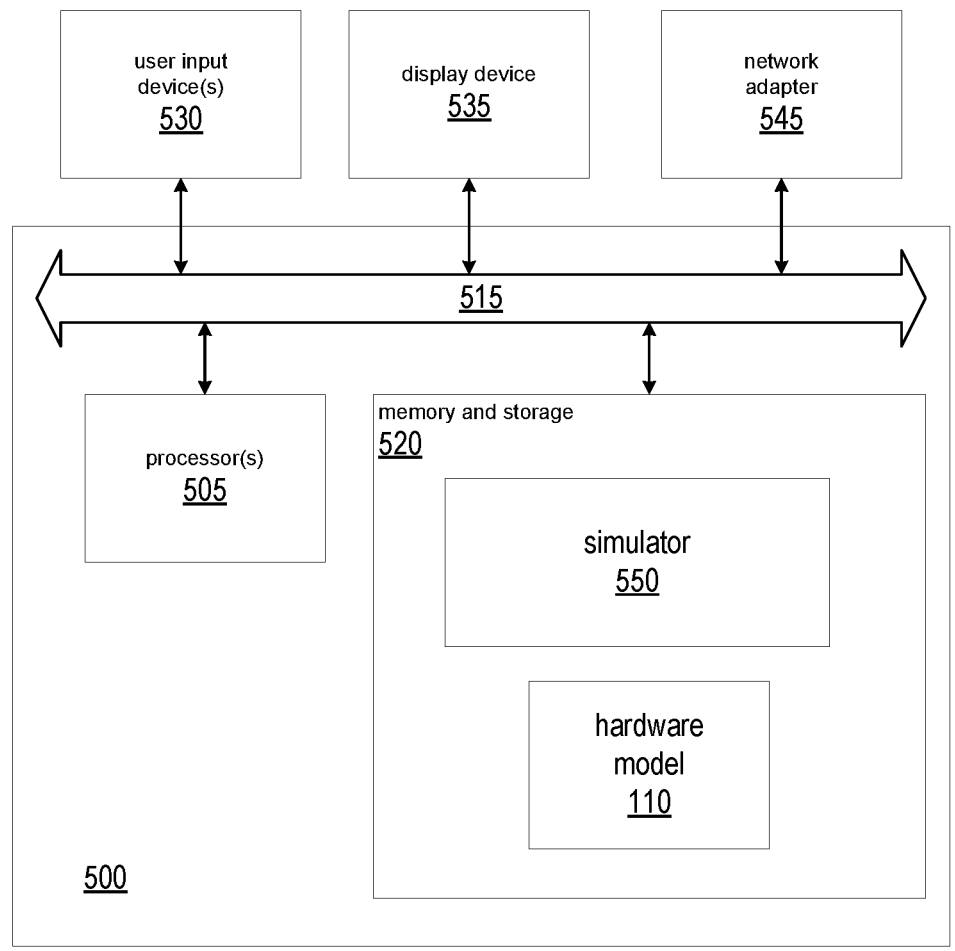
FIG. 5 is a block diagram illustrating an exemplary data processing system on which the hardware debug server and simulator kernel can be implemented.

FIG. 5 is a block diagram illustrating an exemplary data processing system (system) 500 on which the hardware debug server 106 (FIG. 1) and simulator kernel (108) can be implemented. A high-level synthesis tool (FIG. 3, #304) can also be implemented on the system 500. System 500 includes at least one processor circuit (or "processor"), e.g., a central processing unit (CPU) 505 coupled to memory and storage arrangement 520 through a system bus 515 or other suitable circuitry. System 500 stores program code that implements simulator 550 and hardware model 110 within memory and storage arrangement 520. Processor 505 executes the program code accessed from the memory and storage arrangement 520 via system bus 515. In one aspect, system 500 is implemented as a computer or other data processing system that is suitable for storing and/or executing program code. It should be appreciated, however, that system 500 can be implemented in the form of any system including a processor and memory that is capable of performing the functions described within this disclosure.

Memory and storage arrangement 520 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid state drive (SSD), or other persistent data storage device. System 500 may also include one or more cache memories (not shown) that provide temporary storage of at least some program code and data in order to reduce the number of times program code and data must be retrieved from local memory and persistent storage during execution.

Input/output (I/O) devices such as user input device(s) 530 and a display device 535 may be optionally coupled to system 500. The I/O devices may be coupled to system 500 either directly or through intervening I/O controllers. A network adapter 545 also can be coupled to system 500 in order to couple system 500 to other systems, computer systems, remote printers, and/or remote storage devices through intervening private or public networks. Modems, cable modems, Ethernet cards, and wireless transceivers are examples of different types of network adapter 545 that can be used with system 500.

Memory and storage arrangement 520 may store simulator 550, which is part of an electronic design automation (EDA) application. Simulator 550, being implemented in the form of executable program code, is executed by processor(s) 505. As such, simulator 550 is considered part of system 500. System 500, while executing simulator 550, receives and operates on hardware model 110.

Simulator 550, hardware model 110 and any data items used, generated, and/or operated upon by simulator 550 are functional data structures that impart functionality when employed as part of system 500 or when such elements, including derivations and/or modifications thereof, are loaded into an IC such as a programmable IC causing implementation and/or configuration of a circuit design within the programmable IC.

Certain implementations are directed to a computer program product (e.g., nonvolatile memory device), which includes a machine or computer-readable medium having stored thereon instructions which may be executed by a computer (or other electronic device) to perform these operations/activities.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for debugging circuit designs. Other aspects and features will be apparent to those skilled in the art from consideration of the specification. The methods and system may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A method of debugging, comprising:
receiving by a hardware debug server executing on a computer system, a first high-level language (HLL) debugging command for setting a breakpoint in an HLL software specification;
translating by the hardware debug server, the first HLL debugging command into a first hardware debugging command that specifies a condition of a hardware finite state machine that is representation of the software specification;
inputting the first hardware debugging command to a simulator executing on the computer system;

adding a conditional breakpoint on the finite state machine by the simulator in response to the first hardware debugging command;

executing a simulation of the finite state machine representation;

suspending execution of the simulation in response to detecting the condition in the finite state machine;

inputting by the hardware debug server, debugging information associated with the HLL software specification;

inputting by the hardware debug server, debugging information that provides a mapping of elements of the HLL software specification to elements of the hardware finite state machine; and cross-referencing the debugging information associated with the HLL software specification with the mapping of the elements of the HLL software specification to the elements of the hardware finite state machine in a database, wherein the translating includes determining from the database an element of the hardware finite state machine, cross-referenced with a HLL statement specified in the first HLL debugging command.

2. The method of claim 1, further comprising:

determining, in response to suspending execution of the simulation, a statement of the HLL software specification that corresponds to the condition in the hardware finite state machine; and outputting data indicating the statement of the HLL software specification.

3. The method of claim 1, wherein the determining the statement of the HLL software specification includes determining from the database the statement of the HLL software specification, cross-referenced with an element of the hardware finite state machine indicated by the conditional breakpoint occurred.

4. The method of claim 1, further comprising:

receiving by the hardware debug server, a second HLL debugging command that requests a value of a variable of the HLL software specification;

translating by the hardware debug server, the second HLL debugging command into a second hardware debugging command that obtains a value of a signal of the hardware finite state machine;

inputting the second hardware debugging command to the simulator;

reading the value of the signal by the simulator; and outputting the value of the signal in association with a name of the variable.

5. The method of claim 4, further comprising:

inputting by the hardware debug server, debugging information associated with the HLL software specification;

inputting by the hardware debug server, debugging information that provides a mapping of elements of the HLL software specification to elements of the hardware finite state machine;

cross-referencing the debugging information associated with the HLL software specification with the mapping of the elements of the HLL software specification to the elements of the hardware finite state machine in a database; and wherein the translating the second HLL debugging command includes determining from the database, the signal of the hardware finite state machine cross-referenced with the name of the variable specified in the second HLL debugging command.

6. The method of claim 1, further comprising:

wherein the hardware state machine references a value in a memory that is modeled in a language other than a hardware description language in which the hardware state machine is specified;

registering with the simulator a callback function that accesses the memory;

receiving by the hardware debug server, a second HLL debugging command that requests a value of a variable of the HLL software specification;

translating by the hardware debug server, the second HLL debugging command into a second hardware debugging command that obtains a value of a signal of the hardware finite state machine;

inputting the second hardware debugging command to the simulator;

executing the callback function to read the value of the signal by the simulator from the memory; and outputting the value of the signal in association with a name of the variable.

7. The method of claim 1, wherein the receiving includes receiving the first HLL debugging command via a network interface to a debugger front-end executing on another computer system.

8. The method of claim 1, further comprising:

determining, in response to suspending execution of the simulation, a statement of the HLL software specification that corresponds to the condition in the hardware finite state machine;

outputting data indicating the statement of the HLL software specification;

receiving by the hardware debug server, a second HLL debugging command that requests a value of a variable of the HLL software specification;

translating by the hardware debug server, the second HLL debugging command into a second hardware debugging command that obtains a value of a signal of the hardware finite state machine;

inputting the second hardware debugging command to the simulator;

reading the value of the signal by the simulator; and outputting the value of the signal in association with a name of the variable.

9. The method of claim 8, further comprising:

inputting by the hardware debug server, debugging information associated with the HLL software specification;

inputting by the hardware debug server, debugging information that provides a mapping of elements of the HLL software specification to elements of the hardware finite state machine;

cross-referencing the debugging information associated with the HLL software specification with the mapping of the elements of the HLL software specification to the elements of the hardware finite state machine in a database;

wherein the determining the statement of the HLL software specification includes determining from the database the statement of the HLL software specification cross-referenced with an element of the hardware finite state machine indicated by the conditional breakpoint occurred; and wherein the translating the second HLL debugging command includes determining from the database the signal of the hardware finite state machine, cross-referenced with the name of the variable specified in the second HLL debugging command.

10. A debugging system, comprising:
a processor; and
a memory arrangement coupled to the processor, wherein the memory arrangement is configured with instructions that when executed by the processor cause the processor to perform operations including:
receiving by a hardware debug server, a first high-level language (HLL) debugging command for setting a breakpoint in an HLL software specification;
translating by the hardware debug server, the first HLL debugging command into a first hardware debugging command that specifies a condition of a hardware finite state machine that is representation of the software specification;
inputting the first hardware debugging command to a simulator;
adding a conditional breakpoint on the finite state machine by the simulator in response to the first hardware debugging command;
executing a simulation of the finite state machine representation; and
suspending execution of the simulation in response to detecting the condition in the finite state machine;
inputting by the hardware debug server, debugging information associated with the HLL software specification;
inputting by the hardware debug server, debugging information that provides a mapping of elements of the HLL software specification to elements of the hardware finite state machine; and
cross-referencing the debugging information associated with the HLL software specification with the mapping of the elements of the HLL software specification to the elements of the hardware finite state machine in a database,
wherein the translating includes determining from the database an element of the hardware finite state machine, cross-referenced with a HLL statement specified in the first HLL debugging command.

11. The system of claim 10, wherein the memory arrangement is further configured with instructions that when executed by the processor cause the processor to perform operations including:
determining, in response to suspending execution of the simulation, a statement of the HLL software specification that corresponds to the condition in the hardware finite state machine; and
outputting data indicating the statement of the HLL software specification.

12. The system of claim 10, wherein the instructions for determining the statement of the HLL software specification include instructions for determining from the database the statement of the HLL software specification, cross-referenced with an element of the hardware finite state machine indicated by the conditional breakpoint occurred.

13. The system of claim 10, wherein the memory arrangement is further configured with instructions that when executed by the processor cause the processor to perform operations including:
receiving by the hardware debug server, a second HLL debugging command that requests a value of a variable of the HLL software specification;
translating by the hardware debug server, the second HLL debugging command into a second hardware debugging command that obtains a value of a signal of the hardware finite state machine;
inputting the second hardware debugging command to the simulator;
reading the value of the signal by the simulator; and
outputting the value of the signal in association with a name of the variable.

14. The system of claim 13, wherein the memory arrangement is further configured with instructions that when executed by the processor cause the processor to perform operations including:
inputting by the hardware debug server, debugging information associated with the HLL software specification;
inputting by the hardware debug server, debugging information that provides a mapping of elements of the HLL software specification to elements of the hardware finite state machine;
cross-referencing the debugging information associated with the HLL software specification with the mapping of the elements of the HLL software specification to the elements of the hardware finite state machine in a database; and
wherein the translating the second HLL debugging command includes determining from the database, the signal of the hardware finite state machine cross-referenced with the name of the variable specified in the second HLL debugging command.

15. The system of claim 10, wherein the hardware state machine references a value in a memory that is modeled in a language other than a hardware description language in which the hardware state machine is specified, and the memory arrangement is further configured with instructions that when executed by the processor cause the processor to perform operations including:
registering with the simulator a callback function that accesses the memory;
receiving by the hardware debug server, a second HLL debugging command that requests a value of a variable of the HLL software specification;
translating by the hardware debug server, the second HLL debugging command into a second hardware debugging command that obtains a value of a signal of the hardware finite state machine;
inputting the second hardware debugging command to the simulator;
executing the callback function to read the value of the signal by the simulator from the memory; and
outputting the value of the signal in association with a name of the variable.

16. The system of claim 10, wherein the instructions for receiving include instructions for receiving the first HLL debugging command via a network interface to a debugger front-end executing on another computer system.

17. The system of claim 10, the memory arrangement is further configured with instructions that when executed by the processor cause the processor to perform operations including
determining, in response to suspending execution of the simulation, a statement of the HLL software specification that corresponds to the condition in the hardware finite state machine;
outputting data indicating the statement of the HLL software specification;
receiving by the hardware debug server, a second HLL debugging command that requests a value of a variable of the HLL software specification;
translating by the hardware debug server, the second HLL debugging command into a second hardware debugging command that obtains a value of a signal of the hardware finite state machine;

inputting the second hardware debugging command to the simulator;

reading the value of the signal by the simulator; and outputting the value of the signal in association with a name of the variable.

18. The system of claim 17, wherein the memory arrangement is further configured with instructions that when executed by the processor cause the processor to perform operations including:

inputting by the hardware debug server, debugging information associated with the HLL software specification;

inputting by the hardware debug server, debugging information that provides a mapping of elements of the HLL software specification to elements of the hardware finite state machine;

cross-referencing the debugging information associated with the HLL software specification with the mapping of the elements of the HLL software specification to the elements of the hardware finite state machine in a database;

wherein the instructions for determining the statement of the HLL software specification include instructions for determining from the database the statement of the HLL software specification cross-referenced with an element of the hardware finite state machine indicated by the conditional breakpoint occurred; and wherein the instructions for translating the second HLL debugging command include instructions for determining from the database the signal of the hardware finite state machine, cross-referenced with the name of the variable specified in the second HLL debugging command.

* * * * *